(12) United States Patent
Barbarek et al.

(10) Patent No.: US 8,291,191 B2
(45) Date of Patent: Oct. 16, 2012

(54) SYSTEM AND METHOD FOR SAFELY AUTOMATING THE GENERATION OF MULTIPLE DATA DEFINITION LANGUAGE STATEMENTS

(75) Inventors: Wayne Joseph Barbarek, Chicago, IL (US); James Lawrence Broadhurst, Batavia, IL (US)

(73) Assignee: Computer Associates Think, Inc., Islandia, NY (US)

( * ) Notice: Subject to any disclaimer, the term of this patent is extended or adjusted under 35 U.S.C. 154(b) by 823 days.

(21) Appl. No.: 12/030,495

(22) Filed: Feb. 13, 2008

(65) Prior Publication Data

US 2009/0204782 A1 Aug. 13, 2009

(51) Int. Cl.
*G06F 12/00* (2006.01)
*G06F 13/00* (2006.01)
*G06F 13/28* (2006.01)
*G06F 7/00* (2006.01)
*G06F 17/30* (2006.01)

(52) U.S. Cl. ........................................ 711/173; 707/756

(58) Field of Classification Search .................. None
See application file for complete search history.

(56) References Cited

U.S. PATENT DOCUMENTS 6,457,003 B1 * 9/2002 Gajda et al. .......................... 1/1

OTHER PUBLICATIONS

Bruni et al., DB2 UDB for z/OS Version 8 Technical Preview, Apr. 2003, IBM, 34 pages.*

* cited by examiner

*Primary Examiner* — Kevin Ellis
*Assistant Examiner* — Gary W Cygiel
(74) *Attorney, Agent, or Firm* — Michael J. Buchenhorner (57) ABSTRACT

A system and method includes steps or acts of: organizing table partitions in logical order; presenting the partition table numbers and their current ending values in logical order to a user; receiving an alter command from the user, the alter command specifying at least one logical partition number and its corresponding ending value; internally matching the specified logical partition number to its corresponding physical partition number; altering the physical partitioning of the table by manipulating one or more current ending values of partitions by altering the current ending value of the physical partition to which the specified logical partition is associated, such that new ending values are generated; and automatically generating at least one data definition language statement corresponding to the alter command, using the new ending value.

18 Claims, 8 Drawing Sheets

SYSTEM AND METHOD FOR SAFELY AUTOMATING THE GENERATION OF MULTIPLE DATA DEFINITION LANGUAGE STATEMENTS

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of data management and more particularly relates to the field of DB2 table objects.

BACKGROUND OF THE INVENTION

With the advent of IBM®'s DB2 Version 8, it became necessary for the Unicenter DB2 products to support Table-Controlled Partitioning (TCP.) It was decided that one of the design items for the project, in the effort to support TCP, would be to provide a means of modifying the partitions of a TCP table through interactive screens similar to those used for modifying partitions of an index object. One of the primary objectives was to provide and maintain symmetry between the two methods of altering partitions and their limit values—for both Table Controlled Partitioning (TCP) and Index Controlled Partitioning (ICP.) This, in turn, would facilitate their ease of use and provide some degree of intuitiveness to users already accustomed to and familiar with performing similar operations against index objects using the "Index Partitions Limit Key Values" screen.

Further, it was discovered that the most natural method of presenting the needed information pertaining to the arrangement of partitions, from the user's perspective, was to do so by always providing the orientation of an object's partitions in logical order rather than physical order. This is because it was also discovered that this is how DB2 manages the distribution of data across multiple partitions as it pertains to the ending values established or defined for each partition in a partitioned tablespace. By doing this, the user may more easily view and manage partitions and their ending values using the natural linear display of these items.

The difficulty in managing significant numbers of partitions, altering their ending values so that data may be redistributed at will—especially after a tablespace had been rotated—became quite apparent when it was further discovered that, although DB2 managed the data through the partitions using logical means, altering any physical attributes for any one, or number of partitions, required that it be done using only the partition's physical numbers rather than the more (seemingly) intuitive logical numbers.

Viewing partitions on interactive user screens showing only physical numbers can become a nonsensical jumble of seemingly non-contiguous physical partitions and physical partition numbering when presented and viewed using logical ordering (as compared to physical ordering, which would then adversely impact the presentation and ordering of limit key ending values in the same way, making them nearly, if not absolutely, impossible to understand and maintain). Since tablespaces may contain hundreds or thousands of partitions, it can become a daunting task, or be nearly impossible, to perform some simple tasks without grueling hours of manual analysis and research—and even then, there is no guarantee that the alterations and Data Definition Language (DDL) derived from such an effort will successfully execute the very first time because of the unavoidable element of human error.

Therefore, there is a need for a system and method to overcome the stated shortcomings of the prior art.

SUMMARY OF THE INVENTION

Briefly, according to an embodiment of the invention a method includes steps or acts of: organizing table partitions in logical order; presenting the partition table numbers and their current ending values in logical order to a user; receiving an alter command from the user, the alter command specifying at least one logical partition number and its corresponding ending value; internally matching the specified logical partition number to its corresponding physical partition number; altering the physical partitioning of the table by manipulating one or more current ending values of partitions by altering the current ending value of the physical partition to which the specified logical partition is associated, such that new ending values are generated; and automatically generating at least one data definition language statement corresponding to the alter command, using the new ending value.

The method can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a method and apparatus for safely automating the generation of multiple DDL statements for the purpose of making complex multiple alterations to the partitions and partitioning key ending values of DB2 table objects. According to an embodiment of the present invention, the method uses alterations only, thus eliminating the need to either: a) drop and recreate the table object or any of its dependencies, and/or b) unload data from any of its partitions before said alterations are made. In this manner we facilitate and further expedite the alterations, while at the same time eliminating human error and guesswork. This substantially reduces the amount of time that would otherwise be required to manually plan and develop the same processes; and substantially reduce or completely eliminate the duration of time that the table object and its data would otherwise be inaccessible when conventional methods are used to make similar complex alterations.

The method, according to an embodiment of the present invention, organizes and presents the partitions and their ending values using only their logical numbers and sequencing, while conveniently removing from the user concerns as to their underlying physical numbering relationships. Additionally, with this method there is no need to further develop sophisticated algorithms to sort out the confusion and generate the appropriate and frequently complex sets and sequences of DDL statements that would be required and understandable by DB2 to make any desired changes to any number of partitions. This alleviates any necessity for end-users having to concern themselves with the complicated task of determining which physical partition number was associated with what particular logical partition number; or, the required sequence in which the alterations must be performed in order to successfully apply all changes without resulting in SQL Errors because, for example, a statement was inadvertently executed out of sequence. Nor is there the need to unnecessarily drop and recreate the object; nor the need to unnecessarily unload and reload data from and to the partitions that are the target of one or more alterations.

According to an embodiment of the present invention, these same tasks are now completely automated with automatically generated DDL that is guaranteed to work each and every time—no matter how complex, no matter how many partitions, and no matter how jumbled the relationships between logical and physical partition numbers—taking only seconds using few keystrokes. With the advent of being able to also alter Index partition ending values as well, the same can be applied and implemented for index objects as well as for TCP table objects.

The following describes the propagation of changes to a partitioning TCP table's partitions (or a partitioned index's partitions) using methods that take advantage of new DB2 V8 features so as not to require the unloading and loading of the partitioning table's data. For the purpose of this design description, changes to a partitioning table's partitions are of two kinds: logical and physical.

Logical changes are those that are made exclusively through the RC/Objects Table Alter screens and principally involve the manipulation of one or more partition ending key values or the addition of new partitions using a DB2 ALTER TABLE statement only. No unload of data nor drop/create is required when implementing a logical change.

Physical changes are those that are made primarily through the RC/Objects Tablespace Alter screens and involve manipulation of one or more partition's physical attributes and/or the explicit addition, removal or rearrangement of partitions using the RC/Objects Tablespace Alter screens using DB2 ALTER TABLESPACE or requiring the drop and re-creation of the partitioning table's tablespace and dependent objects.

Because the user of the product manages the partitions of a table object's tablespace though logical means, a significant advantage of implementing Logical alterations through the RC/Objects Table Alter screens is that users need not concern themselves with the actual complex corresponding physical-to-logical and logical-to-physical underlying relationships and arrangements of partitions, nor the alterations that are required and the DDL that must be generated to make the necessary physical alterations to a table object's tablespace in order to achieve the logical end results that are wanted from the user's end perspective.

We focus our discussion on anticipated common alterations or changes to a partitioning table's partitions that are made through the RC/Objects Table Alteration screens. These changes are purely logical and require no unloading and loading of a partitioning table's data, nor the necessity to drop and re-create the object to achieve the same end result. We limit our discussion for clarity and brevity. The exemplary changes discussed herein are not to be construed as limitations to the embodiments; they are merely examples chosen in order to enable those with knowledge in the art to fully understand the invention.

That which is described here is applicable for alterations to a partitioning table using RC/Update or directly and explicitly made to the same object in an RC/Migrator Alter, Migration or Compare strategy. Notwithstanding rotating of partitions first-to-last, the same is also applicable to index objects and has been successfully adopted and implemented for them as well, thus providing intuitive constancy and symmetry between like screens and equivalent algorithms for both object types.

Diagram and Tables

Figure 1:
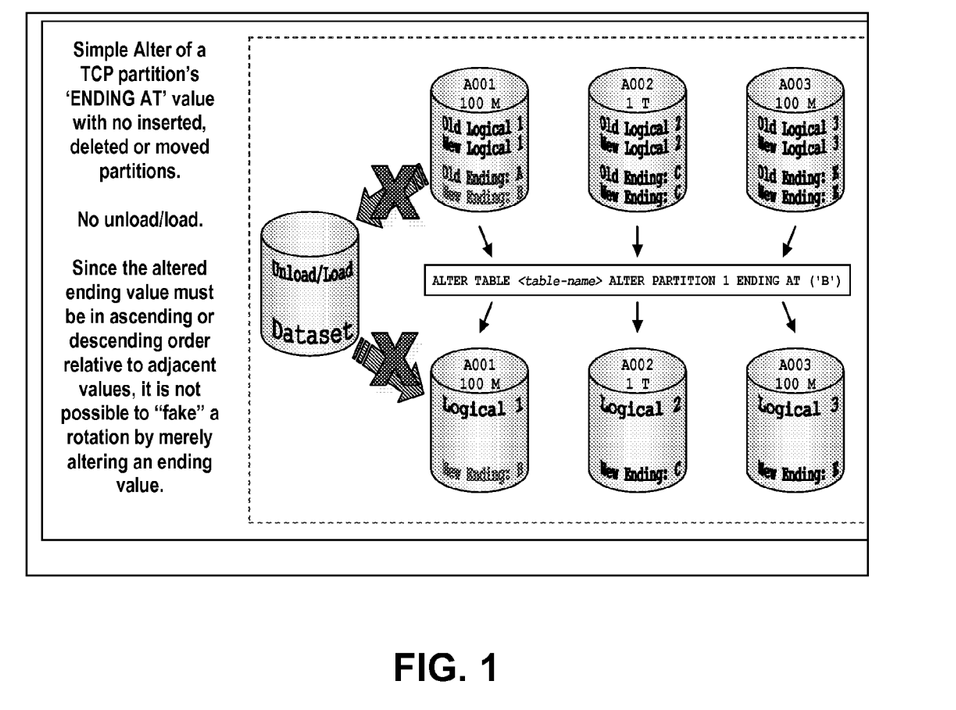
FIG. 1 shows a simple alter of the ENDING AT value, according to an embodiment of the present invention.

Referring now to the illustrations and particularly to FIG. 1, there is shown a simple alter of a simple ENDING AT value, with no unload/load. This alteration is accomplished by altering the 'ENDING AT' value of the physical partition to which the specified logical partition is associated. The DDL generated will be the single statement:

ALTER TABLE <table-name> ALTER PARTITION 1 ENDING AT ('B')

Alterations of this kind require no unload/load and cause no data loss. Upon REORG, the first and second partition's data is redistributed amongst each other according to the new ending values without any loss of data.

TABLE 1.1

| Transaction ALTER Nodes: | | | | |
|---|---|---|---|---|
| | P_PART | SIZE | L_PART | ENDING |
| OLD | A001 | 100 M | 1 | A |
| NEW | A001 | — | 1 | B |
| OLD | A002 | 1 T | 2 | C |
| NEW | A002 | — | 2 | C |
| OLD | A003 | 100 M | 3 | E |
| NEW | A003 | — | 3 | E |

TABLE 1.2

| Transaction ALTER Nodes: | | | | |
|---|---|---|---|---|
| | P_PART | SIZE | L_PART | ENDING |
| OLD | A002 | 1 T | 1 | C |
| NEW | A002 | — | 1 | B |
| OLD | A003 | 100 M | 2 | E |
| NEW | A003 | — | 2 | E |
| OLD | A001 | 100 M | 3 | G |
| NEW | A001 | — | 3 | G |

In this second example, we accomplish the same alter as in the first example; however this is done on a partitioning table that has been rotated by DB2. This demonstrates what the expected OLD and NEW values should be when such an alteration is made against a DB2-rotated partitioning table. As in the first example, the alteration is accomplished by altering the 'ENDING AT' value of the physical partition to which the specified logical partition is associated. The DDL generated will be the single statement:

ALTER TABLE <table-name> ALTER PARTITION 2 ENDING AT ('B')

Note that in this example, because the partitions have been previously rotated, physical partition 2 is altered rather than physical partition 1 as shown in the first example. Alterations of this kind require no unload/load and causes no data loss. Upon REORG, the first and second partition's data is redistributed amongst each other according to the new ending values without any loss of data.

Explicit alterations to the tablespace may not be made via Table Alter screens; and all such alterations, such as primary/secondary space sizing, and so forth, must be made via the Tablespace Alter screens. Important: Since the ALTER TABLE statement requires the number of the physical partition whose 'ENDING AT' value is being altered, the logical partition's corresponding "OLD" physical partition number is specified in the alter statement. A single alter statement may be used, as demonstrated in the above examples, only when no re-sequencing of the logical partitions has been performed on the Table Alter screen, such as through implicit or explicit inserts and/or deletes or by physically moving one or more logical partitions from its original position to another position in the sequence. With the COMPARE primary command, the user may observe if any alterations have upset the original logical sequencing of the partitions.

SNAP Recovery Processing: Restoration from this kind of alteration is performed by applying identical reverse alterations using this generated DDL for the first example:

ALTER TABLE <table-name> ALTER PARTITION 1 ENDING AT ('A')

And this generated DDL for the second example:

ALTER TABLE <table-name> ALTER PARTITION 2 ENDING AT ('C'):

No drop/create is required and no rows need to be unloaded in order to recover from these kinds of alterations. Depending on the alteration, however, the altered partition and one or more adjacent partitions are placed in REORP status.

Multiple changes represented using a single transaction: Assuming that the above tables represent the contents of single transactions, as many like alterations may also be incorporated within the same transaction; thus, alleviating the need to create additional transaction records for each like change.

Add (append) Partition, With No Unload/Load

TABLE 2.1

| Transaction ALTER Nodes. | | | | |
|---|---|---|---|---|
| | P_PART | SIZE | L_PART | ENDING |
| OLD | A001 | 100 M | 1 | A |
| NEW | A001 | — | 1 | A |
| OLD | A002 | 1 T | 2 | C |
| NEW | A002 | — | 2 | C |
| OLD | A003 | 100 M | 3 | E |
| NEW | A003 | — | 3 | E |
| OLD | — | — | — | — |
| NEW | A004 | 100 M | 4 | G |

This alteration is accomplished by both adding (appending) a new physical partition to the table and specifying its 'ENDING AT'. The DDL generated will be the single statement:

ALTER TABLE <table-name> ADD PARTITION ENDING AT ('G')

Figure 2:
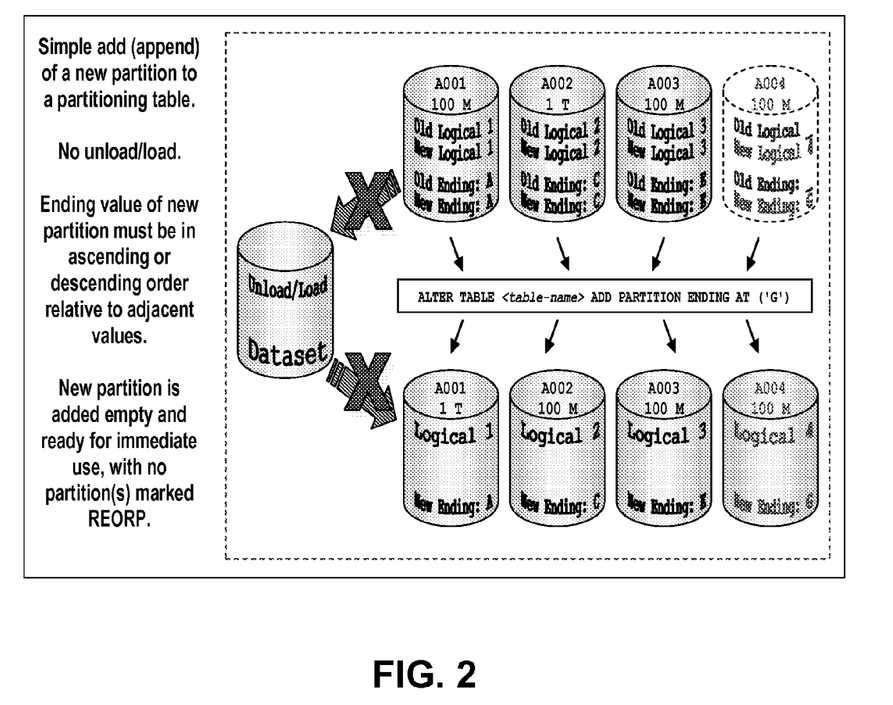
FIG. 2 shows a simple add of a new partition, according to an embodiment of the present invention.

Since this statement does not require a partition number, either logical or physical, the association between the new partition's logical and physical numbers is not required for the generation of this DDL statement. FIG. 2 illustrates the processing of the ADD.

The new partition is the next physical partition not being used until the maximum for the table space has been reached. The new partition's physical and logical numbers are implicit and identical, with both being one more than the total number of partitions in the table prior to the alteration.

Alterations of this kind require no unload/load and causes no data loss. The new partition is empty and ready for immediate use. No partitions in the table are marked REORP.

TABLE 2.2

| Transaction ALTER Nodes | | | | |
|---|---|---|---|---|
| | P_PART | SIZE | L_PART | ENDING |
| OLD | A002 | 1 T | 1 | C |
| NEW | A002 | — | 1 | C |
| OLD | A003 | 100 M | 2 | E |
| NEW | A003 | — | 2 | E |
| OLD | A001 | 100 M | 3 | G |
| NEW | A001 | — | 3 | G |
| OLD | — | — | — | — |
| NEW | A004 | 100 M | 4 | I |

In this second example, we accomplish the same as in the first example; however being done on a partitioning table that has been rotated by DB2. This demonstrates what the expected OLD and NEW values should be when such an alteration is made against a DB2-rotated partitioning table. As in the first example, the alteration is accomplished by both adding (appending) a new physical partition to the table and specifying its 'ENDING AT'. The DDL generated will be the single statement:

ALTER TABLE <table-name> ADD PARTITION ENDING AT ('I')

Since this statement does not require a partition number, either logical or physical, the association between the new partition's logical and physical numbers is not required for the generation of this DDL statement. The new partition is the next physical partition not being used until the maximum for the table space has been reached. The new partition's physical and logical numbers are implicit and identical, with both being one more than the total number of partitions in the table prior to the alteration. Alterations of this kind require no unload/load and causes no data loss. The new partition is empty and ready for immediate use. No partitions in the table are marked REORP.

Explicit alterations to the tablespace may not be made via Table Alter screens; and all such alterations, such as primary/secondary space sizing, etc. must be made via the Tablespace Alter screens only. Important: The existing table space PRIQTY and SECQTY attributes of the previous logical partition are used for the space attributes of the new partition.

SNAP Recovery Processing: Restoration from this kind of alteration must be performed by dropping the altered object and then recreating it as it existed prior to the alterations.

Multiple changes represented using single transaction: Assuming that the above tables represent the contents of single transactions, as many like alterations may also be incorporated within the same transaction; thus, alleviating the need to create additional transaction records for each like change.

Logical Complex Insert Partition, Without Invoking Unload/Load

TABLE 3.1

| Transaction ALTER Nodes | | | | |
|---|---|---|---|---|
| | P_PART | SIZE | L_PART | ENDING |
| OLD | A001 | 100 M | 1 | A |
| NEW | A001 | — | 1 | A |
| OLD | A002 | 1 T | 2 | C |
| NEW | A002 | — | 2 | B |
| OLD | A003 | 100 M | 3 | E |
| NEW | A003 | — | 3 | C |
| OLD | — | — | — | |
| NEW | A004 | 100 M | 4 | E |

Figure 3:
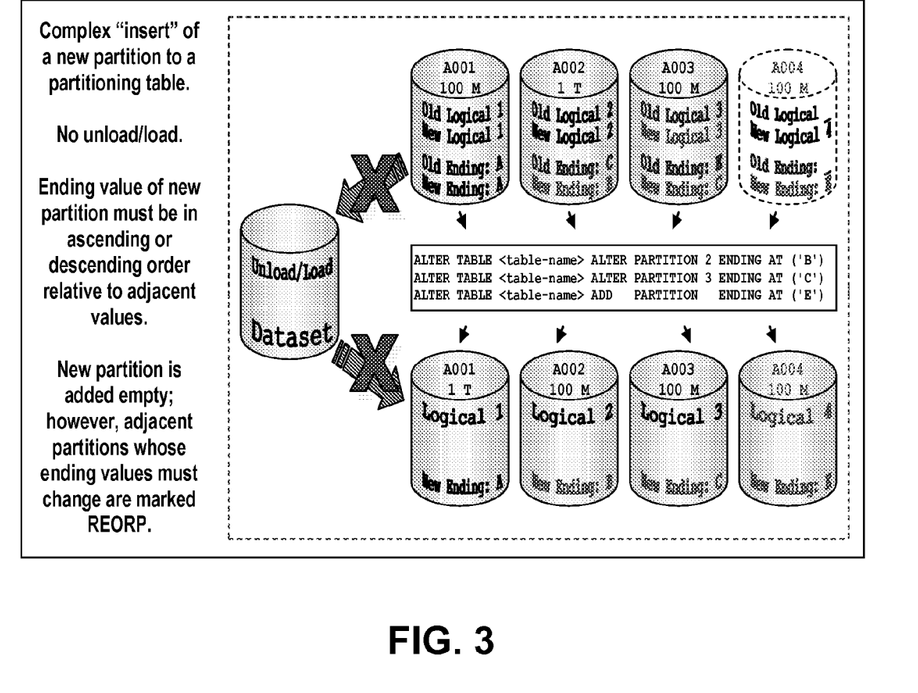
FIG. 3 shows a complex insert of a new partition, according to an embodiment of the present invention.

Refer to FIG. 3 for an illustration of the complex "insert" of a new partition. This alteration is accomplished by logically pushing the inserted partition through the existing partitions by altering the existing partition's Ending Values, until the last logical (or physical) partition is reached using their corresponding physical (or logical) partition numbers, at which time a new partition is added with the same ending value as the last logical (or physical) partition prior to the change (insert) so as to cause the data rows that occupy the partitions, from the point of logical insertion, to be redistributed (moved) to subsequent ascending (or descending) partitions based on each partition's new ending value. The DDL generated will be the three statements:

ALTER TABLE <table-name> ALTER PARTITION 2 ENDING AT ('B')
ALTER TABLE <table-name> ALTER PARTITION 3 ENDING AT ('C')
ALTER TABLE <table-name> ADD PARTITION ENDING AT ('E')

In order for us to accomplish this task, a slight deviation is made to the customary way in which partition alter nodes are managed and subsequently interpreted by DDL generation algorithms. In regards to a partitioning table's transaction alter nodes, rather than physically moving and re-arranging the alter nodes on inserts as is done for tablespace and index partition nodes, the nodes are locked in place and not moved or re-arranged; a new alter node is instead appended to, rather than inserted in the middle of, the alter list and the ending values are moved (or rotated) through the nodes and into the newly appended node.

Any number of partitions may be inserted using this method. For example, to logically insert two new partitions with ending values 'B' and 'D' (between partitions 1 and 2, having ending values 'A' and 'C'; and between partitions 2 and 3, having ending values 'C' and 'E') into the same list as we started out in this example, these following statements would be used:

ALTER TABLE <table-name> ALTER PARTITION 2 ENDING AT ('B')
ALTER TABLE <table-name> ALTER PARTITION 3 ENDING AT ('C')
ALTER TABLE <table-name> ADD PARTITION ENDING AT ('D')
ALTER TABLE <table-name> ADD PARTITION ENDING AT ('E')

Without the table's tablespace having been previously rotated FIRST-TO-LAST, the process may be accomplished by applying the necessary alterations to each of the partitions, from the point of the first insertion, in either physical or logical partition ascending order. However, if the tablespace had been previously rotated, then the process is more complex, as is shown in Table 3.2 that is described next.

TABLE 3.2

| Transaction ALTER Nodes | | | | |
|---|---|---|---|---|
| | P_PART | SIZE | L_PART | ENDING |
| OLD | A002 | 1 T | 1 | C |
| NEW | A002 | — | 1 | C |
| OLD | A003 | 100 M | 2 | E |
| NEW | A003 | — | 2 | D |
| OLD | A001 | 100 M | 3 | G |
| NEW | A001 | — | 3 | E |
| OLD | — | — | — | — |
| NEW | A004 | 100 M | 4 | G |

In this second example, we accomplish the same; however being done on a partitioning table that has been previously rotated by DB2. This demonstrates what the expected OLD and NEW values should be in the transaction when such an alteration is made against a DB2-rotated partitioning table. Because the logical partitions are no longer in physical order, the alterations must be made according to its current logical ordering, but via each logical partition's physical number in order to accomplish the same end-result as was described in Table 3.1: i.e. logically pushing the inserted partition through the existing partitions by altering the existing partition's Ending Values, until the last logical partition is reached using their corresponding physical partition numbers, at which time a new partition is added with the same ending value as the last logical partition prior to the change (insert) so as to cause the data rows that occupy the partitions, from the point of logical insertion, to be redistributed (moved) to subsequent ascending (or descending) partitions base on each partition's new ending value. The DDL generated will be the statements:

ALTER TABLE <table-name> ALTER PARTITION 3 ENDING AT ('D')
ALTER TABLE <table-name> ALTER PARTITION 1 ENDING AT ('E')
ALTER TABLE <table-name> ADD PARTITION ENDING AT ('G'

Because of the partitions having been previously rotated, physical partitions 3 and 1 are altered rather than physical partitions 2 and 3 as shown in the first example. Alterations of this kind require no unload/load and causes no data loss. Upon REORG, the data on all partitions marked REORP is redistributed amongst each other according to the new ending values without any loss of data. Explicit alterations to the tablespace may not be made via Table Alter screens; and all such alterations, such as primary/secondary space sizing, etc. must be made via the Tablespace Alter screens only. Important: The existing table space PRIQTY and SECQTY attributes of the previous logical partition are used for the space attributes of each new partition.

SNAP Recovery Processing: Restoration from this kind of alteration must be performed by dropping the altered object and then recreating it as it existed prior to the alterations.

EXAMPLE #4.1

TABLE 4.1

| Transaction ALTER Nodes | | | | |
|---|---|---|---|---|
| | P_PART | SIZE | L_PART | ENDING |
| OLD | A002 | 1 T | 2 | B |
| NEW | A002 | — | 1 | B |
| OLD | A003 | 100 M | 3 | C |
| NEW | A003 | — | 2 | C |
| OLD | A001 | 100 M | 1 | A |
| NEW | A001 | — | 3 | D |

Figure 4:
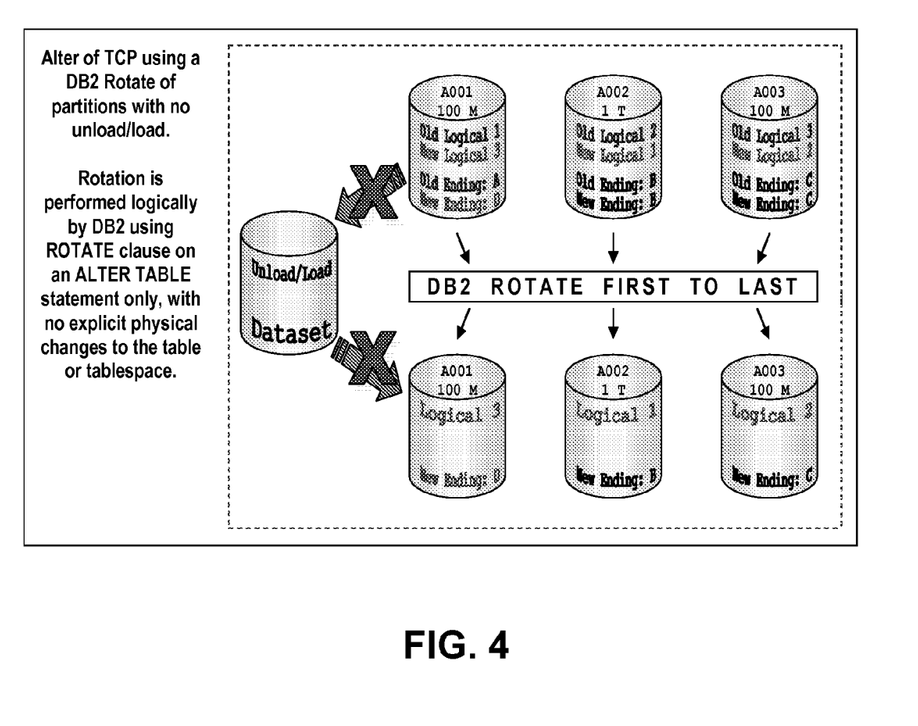
FIG. 4 shows an alter of a TCP using a DB2 ROTATE, according to an embodiment of the present invention.

Refer to FIG. 4 for an illustration of altering the TCP using a DB2 rotate. A DB2 ROTATE request is accomplished by keying in the 'ROTATE' primary command. The DDL generated will be the single statement:

ALTER TABLE <table-name> ROTATE PARTITION FIRST TO LAST ENDING AT ('D') RESET

When inspecting the Transaction ALTER Nodes, differentiating between an authentic DB2-ROTATE and other kinds of alterations that mimic such a rotate may be facilitated by inspecting the NEW and OLD fields. On authentic DB2-ROTATE:

1. The transaction node for the first partition is physically (or may be made to appear to have been physically moved) so that it is the last partition.
2. The NEW physical partition number fields in all nodes are not re-sequenced and remain unchanged after the move.
3. The NEW logical partition number fields are re-sequenced after the move.
4. With the exception of the moved partition node, both the logical partition numbers and ending values are maintained in their original ascending order (with descending ending values when the keys are in descending order.)
5. Ending values are not rotated (or push/pulled) though the nodes, as is done when inserting, moving, copying, replicating or deleting partitions.
6. The difference between the OLD and NEW logical partition numbers is always +n; where, n is 0 when there no authentic rotate is present; and where n is +1 in all nodes for each concurrent rotate, not to exceed the number of original partitions in the table's tablespace. For example, if the same partitions were rotated twice, the difference between the OLD and NEW logical partition numbers will be +2; and, the generated DDL would include two distinct ALTER TABLE rotate statements—one for each rotate. This allows the number of rotations in a single transaction to be (as many as) equal the number of partitions in the table's tablespace without having to introduce additional transaction records.
7. No difference exists between the OLD and NEW Ending Value in any of the non-rotated transaction nodes.
8. A difference exists between the NEW and OLD Ending Value in only the first-to-last rotated transaction node.

Also see "Alter Example #5: Logical Rotate via partition re-sequencing and ENDING AT changes" following this example. Important: An alteration of this kind, although it requires no unload/load, causes the loss of all data in the rotated partition if not first unloaded prior to the rotate. Note: Explicit alterations to the tablespace may not be made via Table Alter screens; and all such alterations, such as primary/secondary space sizing, etc. must be made via the Tablespace Alter screens only.

SNAP Recovery Processing: Restoration from this kind of alteration may be performed by either dropping the altered object and then recreating it as it existed prior to the rotate; or by applying equivalent pseudo logical reverse alterations, in which case no drop/create is required and no rows need to be unloaded in order to recover from the rotate using the generated DDL:

ALTER TABLE <table-name> ALTER PARTITION 2 ENDING AT ('A')
ALTER TABLE <table-name> ALTER PARTITION 3 ENDING AT ('B')
ALTER TABLE <table-name> ALTER PARTITION 1 ENDING AT ('C')

The partition that was rotated first-to-last, however, must have been unloaded prior to the rotate so that its data rows may be restored, and since recovery from a rotate using equivalent reverse alters impacts the ending values of all partitions in the tablespace, all partitions will be placed in REORP status.

TABLE 4.2

| Transaction ALTER Nodes | | | | |
|---|---|---|---|---|
| | P_PART | SIZE | L_PART | ENDING |
| OLD | A003 | 100 M | 2 | C |
| NEW | A003 | — | 1 | C |
| OLD | A001 | 100 M | 3 | D |
| NEW | A001 | — | 2 | D |
| OLD | A002 | 1 T | 1 | B |
| NEW | A002 | — | 3 | E |

In this second example, the same as in the first example is accomplished, however being done on a partitioning table that had been previously rotated by DB2 once before. This demonstrates what the expected OLD and NEW values should be when such an alteration is made against a previously DB2-rotated partitioning table. As in the first example, the alteration is accomplished by keying in the 'ROTATE' primary command. The DDL generated will be the single statement:

ALTER TABLE <table-name> ROTATE PARTITION FIRST TO LAST ENDING AT ('E') RESET

As with Table 4.1, alterations of this kind, although it requires no unload/load, causes the loss of all data in the rotated partition if not first unloaded prior to the rotate. Note: Explicit alterations to the tablespace may not be made via Table Alter screens; and all such alterations, such as primary/secondary space sizing, etc. must be made via the Tablespace Alter screens only. Applicability: These kinds of alters described in the above examples are special Logical types of alters performed by DB2 and are not available as a pseudo-physical alteration.

SNAP Recovery Processing: Restoration from this kind of alteration may be performed by either dropping the altered object and then recreating it as it existed prior to the rotate; or by applying equivalent pseudo logical reverse alterations, in which case no drop/create is required and no rows need to be unloaded in order to recover from the rotate using the following generated DDL:

ALTER TABLE <table-name> ALTER PARTITION 3 ENDING AT ('B')
ALTER TABLE <table-name> ALTER PARTITION 1 ENDING AT ('C')
ALTER TABLE <table-name> ALTER PARTITION 2 ENDING AT ('D')

The partition that was rotated first-to-last, however, must have been unloaded prior to the rotate so that its data rows may be restored, and since recovery from a rotate using equivalent reverse alters impacts the ending values of all partitions in the tablespace, all partitions will be placed in REORP status.

Pseudo-Logical Rotate via ENDING AT changes, With No Unload/Load

EXAMPLE #5.1

TABLE 5.1

Transaction ALTER Nodes

|  | P_PART | SIZE | L_PART | ENDING |
|---|---|---|---|---|
| OLD | A001 | 100 M | 1 | A |
| NEW | A001 | — | 1 | B |
| OLD | A002 | 1 T | 2 | B |
| NEW | A002 | — | 2 | C |
| OLD | A003 | 100 M | 3 | C |
| NEW | A003 | — | 3 | D |

Figure 5:
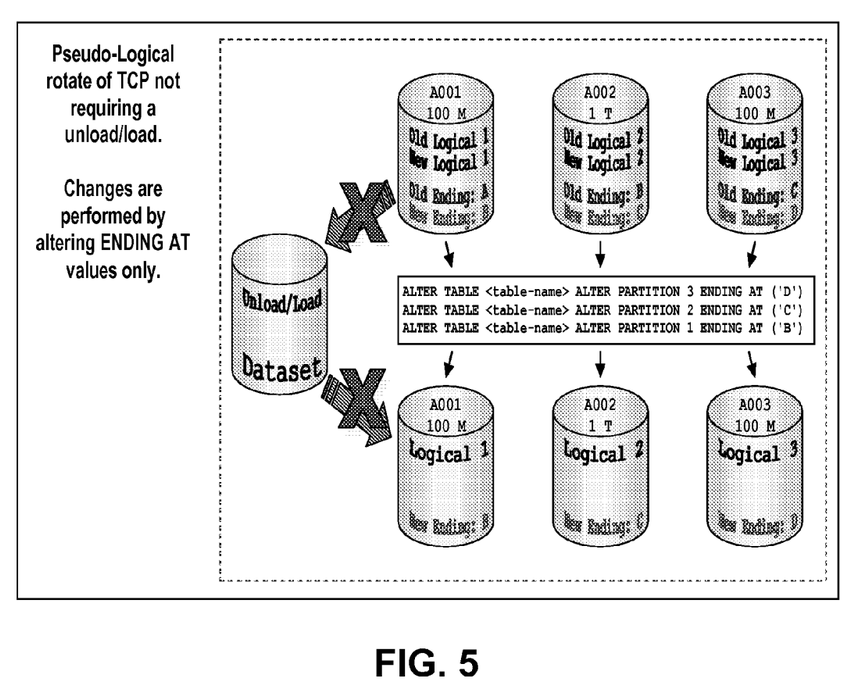
FIG. 5 shows a pseudo-logical rotate of TCP, according to an embodiment of the present invention.

Refer to FIG. 5 for an illustration of the pseudo-logical rotate. This kind of alteration is accomplished with the 'M/A' (Move/After) line command pair, and then altering the moved ending value, as is shown in the above sequence of tiles, 1 through 3. The same may also be accomplished by first altering the ending value for partition 1 and then moving it; or by directly entering new ending values for all three partitions. Warning: Although this kind of alteration causes alterations to the table alter nodes that seem identical to the alterations induced by a DB2 ROTATE, these two kinds of alterations are not the same and must not be treated as such because: the DB2 ROTATE causes all data in the rotated partition to be discarded (RESET), while this alternate (pseudo-logical) rotate does not. Differentiating between a DB2-ROTATE and this kind of alteration is performed by inspecting the NEW and OLD transaction alter nodes node values. One noticeable difference is that on a DB2-ROTATE, the NEW logical partition number fields are re-sequenced, while on this kind of alteration, neither the physical nor logical partition numbers are re-sequenced.

Referring to the above transaction table, rather than re-sequencing the physical or logical partition numbers, the ending values are moved through the nodes instead. So, in essence, when a Move-to-After sequence is performed, rather than representing the move as a move of the actual partition, it is instead accomplished by moving the ending values, only. So, the fist M/A (tile-1) actually Moves the $1^{st}$ partition's ending value 'A' to After the $3^{rd}$ partition's ending value 'C' (tile-2); after which, the 'A' is overtyped with 'D' (tile-3). The move is performed by rotating the ending values through the partitions within the transaction. From the user's perspective, the end result gives the appearance of a Move-to-After.

Any number of partitions (or blocks of partitions) may be logically moved around using this method; or, the user may simply key in the new ending values directly on the screen, with both having the exact same end-result indistinguishable by DDL generation and compare algorithms inspecting the nodes. (Refer to "Alter Example #6: Pseudo Rotate via logical delete & insert partition, with no unload/load," which provides an additional demonstration of this methodology using deletes and inserts.)

Figure 6:
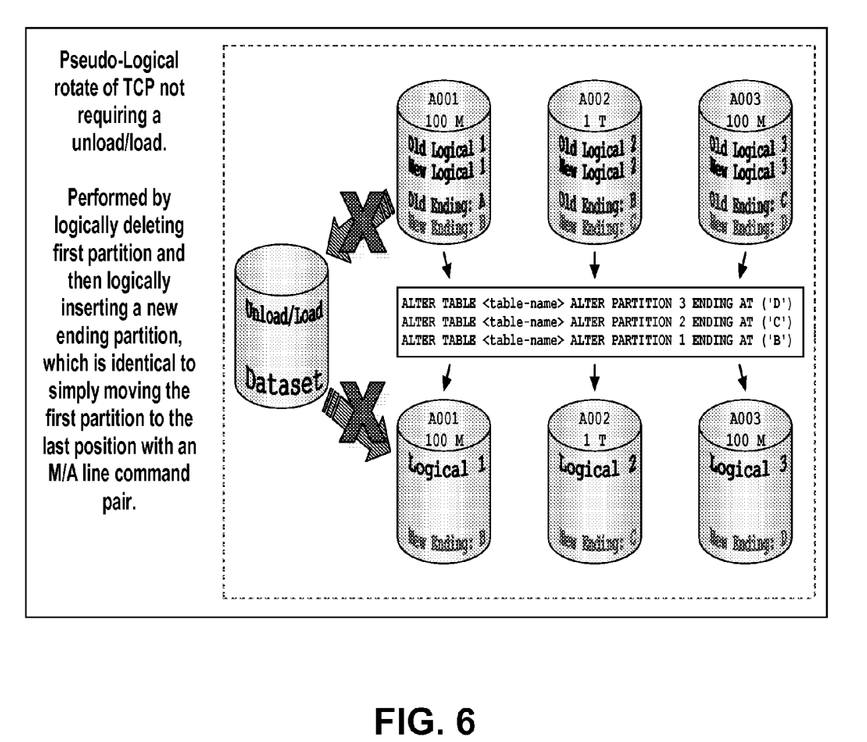
FIG. 6 shows a pseudo-logical rotate of TCP, according to another embodiment of the present invention.

Next, this kind of alteration, in order to remain logical and so that no unload/load is needed, requires that neither the logical nor physical partition numbers be re-sequenced within the transaction, which also enables DDL generation algorithms to differentiate between authentic and faux DB2-ROTATEs. Refer to FIG. 6 for an illustration.

ALTER TABLE <table-name> ALTER PARTITION 3 ENDING AT
ALTER TABLE <table-name> ALTER PARTITION 2 ENDING AT ('C')
ALTER TABLE <table-name> ALTER PARTITION 1 ENDING AT ('B')

Additionally, this kind of alteration must be accomplished such that on each alteration, no ending value overlaps an adjacent ending value. This may require, depending on the alterations being made, that some or all physical partitions be altered in a descending (reverse) logical order. For example, if the alteration were made according to the logical partition sequence numbers only, then the above statements would have been generated in this order:

ALTER TABLE <table-name> ALTER PARTITION 1 ENDING AT ('B')
ALTER TABLE <table-name> ALTER PARTITION 2 ENDING AT ('C')
ALTER TABLE <table-name> ALTER PARTITION 3 ENDING AT However, executing these statements in this order would yield the following error:

DSNT408I SQLCODE=−636, ERROR: THE PARTITIONING KEYS FOR PARTITION 2 ARE NOT SPECIFIED IN ASCENDING OR DESCENDING ORDER

This is because, upon executing the second statement, without first changing the ending value of partition 3 beforehand, there would be in effect two partitions coexisting with the same ending value, which is not a valid thing to do. Therefore, partition 3 must first be altered so that its ending value is different than the ending value to which partition 2 is to be changed. This ensures that no two partitions, at any time, are defined to simultaneously have the same ending values during the course of executing all of the needed statements for the requested change. (Coincidentally, since in this example (#5.1) the physical and logical partitions have a one-to-one relationship—because no rotation first-to-last had been previously performed—the reverse logical ordering of the partitions is also identical to their reverse physical order.)

EXAMPLE #5.2

TABLE 5.2

Transaction ALTER Nodes

|  | P_PART | SIZE | L_PART | ENDING |
|---|---|---|---|---|
| OLD | A002 | 1 T | 1 | B |
| NEW | A002 | — | 1 | C |
| OLD | A003 | 100 M | 2 | C |
| NEW | A003 | — | 2 | D |
| OLD | A001 | 100 M | 3 | D |
| NEW | A001 | — | 3 | E |

In this second example, the same as in the first example is accomplished, however being done on a partitioning table that had been previously rotated by DB2 once before. This demonstrates what the expected OLD and NEW values in the transaction table should be when such an alteration is made against a previously DB2-rotated partitioning table—and, better demonstrates the altering of the physical partitions in their reverse-logical-order. As in the first example, the alteration is accomplished by logically moving the first partition to the end of the list (by moving its ending value, only,) and then altering the appropriate 'ENDING AT' values of all impacted partitions. The DDL generated will be the three statements:

ALTER TABLE <table-name> ALTER PARTITION 1 ENDING AT ('E')
ALTER TABLE <table-name> ALTER PARTITION 3 ENDING AT ('D')
ALTER TABLE <table-name> ALTER PARTITION 2 ENDING AT ('C')

Although the physical partition numbers used in the above ALTER statements (1, 3, 2) do not seem to be in any discernable order, a closer look at their logical order reveals that the statements are arranged and executed in descending order according to each partition's logical partition number.

As with Example #5.1, alterations of this kind require no unload/load and causes no data loss. All partitions whose ending values change, including the next higher partition adjacent to partitions with changed ending values, are placed in REORP status. Upon REORG, all such partitions will have their rows redistributed based on each partition's new ENDING AT value.

Explicit alterations to the tablespace may not be made via Table Alter screens; and all such alterations, such as primary/secondary space sizing, etc. must be made via the Tablespace Alter screens only. Alterations of these kinds require no unload/load and causes no data loss. Upon REORG, all such partitions will have their rows redistributed based on each partition's new ENDING AT value.

Pseudo Rotate via Logical Delete & Insert Partition, With No Unload/Load

EXAMPLE #6.1

TABLE 6.1

| Transaction ALTER Nodes | | | | |
|---|---|---|---|---|
| | P_PART | SIZE | L_PART | ENDING |
| OLD | A001 | 100 M | 1 | A |
| NEW | A001 | — | 1 | B |
| OLD | A002 | 1 T | 2 | B |
| NEW | A002 | — | 2 | C |
| OLD | A003 | 100 M | 3 | C |
| NEW | A003 | — | 3 | D |

This kind of alteration introduces identical changes to the transaction nodes as was described for "Alter Example #5: Pseudo-Logical Rotate via ENDING AT changes, with no unload/load" and identical DDL to be generated, as shown below. The only difference is that it is done using a combination of the Delete and Insert line commands instead.

ALTER TABLE <table-name> ALTER PARTITION 3 ENDING AT
ALTER TABLE <table-name> ALTER PARTITION 2 ENDING AT ('C')
ALTER TABLE <table-name> ALTER PARTITION 1 ENDING AT ('B')

The sequence of events is broken down step-by-step so as to provide an incremental understanding of how this simple transaction is created using these two line commands.

In regards to a partitioning table's transaction alter nodes, rather than physically deleting (marking for delete) the specific target node corresponding to the logical partition on the screen, only the ending value is deleted: all subsequent ending values are then pushed (or rotated) up, towards the head, through the alter nodes to occupy the vacuous position left by the value that was deleted. This leaves a void in the last logical partition on the screen, which is either marked for delete (if it is a node describing an existing logical partition) or flushed from the list (if it is describing a newly inserted logical partition). Any number of partitions may be logically inserted and deleted using this method; or, the user may simply key in the new ending values directly on the screen, with both having the exact same end result indistinguishable by DDL generation and compare algorithms inspecting the nodes. The following demonstrates this process, step by step, from the perspective of RC/Objects Table Alter screens:

STEP 1: User enters the 'D' (Delete) line command on the interactive screen beside the partition and ending value to be deleted and removed from the tablespace. For this discussion, the $1^{st}$ logical partition shall be deleted. (Note: As long as an equal or greater number of partitions are re-inserted, as is demonstrated in the steps that follow, all changes can be performed logically; however, if at least an equal number of partitions is not reinserted, then the effect would be to reduce the number of physical partitions defined for the table's tablespace, which cannot be done using logical means and would therefore require the dropping and re-creating of the tablespace, the table and all dependencies with the newly defined lesser number of partitions.)

STEP 2: After pressing the Enter key, the screen and alter nodes are updated. The ending values for the $2^{nd}$ and $3^{rd}$ nodes are moved through the nodes to take the place of the logically deleted partition, thus opening up the last node and marking it as available for re-use by clearing it's physical part, logical part and ending value.

STEP 3: User enters 'I' (Insert) line command on the interactive screen beside the partition after which the new partition is to be inserted, or appended, to the current displayed list, which is now the $2^{nd}$ logical partition.

STEP 4: After pressing the Enter key, the screen and alter nodes are updated to show an insert, re-using the previously deleted alter node by setting meaningful values into the physical and logical part fields that indicate its actual physical and logical position in the real tablespace.

STEP 5: User enters new ending value for the newly inserted (reclaimed) partition.

STEP 6: After pressing the Enter key, the screen and reclaimed alter node are updated with the new ending value.

EXAMPLE #6.2

TABLE 6.2

| Transaction ALTER Nodes | | | | |
|---|---|---|---|---|
| | P_PART | SIZE | L_PART | ENDING |
| OLD | A002 | 1 T | 1 | B |
| NEW | A002 | — | 1 | C |
| OLD | A003 | 100 M | 2 | C |
| NEW | A003 | — | 2 | D |
| OLD | A001 | 100 M | 3 | D |
| NEW | A001 | — | 3 | E |

In this second example, the same as in the first example is accomplished, however being done on a partitioning table that had been previously rotated by DB2 once before. This demonstrates what the expected OLD and NEW values should be when such an alteration is made against a previously DB2-rotated partitioning table. As in the first example, the alteration is accomplished by first deleing the first partition, inserting a new ending partition, and then altering the inserted partition's 'ENDING AT' value. The same may also be accomplished by first inserting a new ending partition and then deleting the old first partition. Logically, from the perspective of the table alter nodes, the end result is identical to "Alter Example #5: Pseudo-Logical Rotate via ENDING AT changes, with no unload/load."

The DDL generated will be the three statements:

ALTER TABLE <table-name> ALTER PARTITION 1 ENDING AT (HEM)

ALTER TABLE <table-name> ALTER PARTITION 3 ENDING AT

ALTER TABLE <table-name> ALTER PARTITION 2 ENDING AT ('C')

The same as demonstrated in Example 5.2 and for the same reasons explained in Example 5.1, although the physical partition numbers used in the above ALTER statements (1, 3, 2) do not seem to be in any discernable order, a closer look at their logical order reveals that the statements are arranged and executed in descending order according to each partition's logical partition number.

Explicit alterations to the tablespace may not be made via Table Alter screens; and all such alterations, such as primary/secondary space sizing, etc. must be made via the Tablespace Alter screens only. Alterations of this kind require no unload/load and causes no data loss. Upon REORG, all such partitions will have their rows redistributed based on each partition's new ENDING AT value.

Many examples have been provided to illustrate the functionality of the method we describe. The numerous examples, although not exhaustive, also serve to enable those with knowledge in the art to fully understand the invention. We now refer to a flow chart shown in FIG. 7 to highlight the basic processing steps of the invention. First, in step 710, we organize table partitions which are in physical order into a corresponding logical order. Next, in step 720, on a computer display or other presentation medium, we present the table partition numbers and their current ending values to a user. Preferably, we present the logical partition numbers. Many examples of this presentation have been shown.

Figure 7:
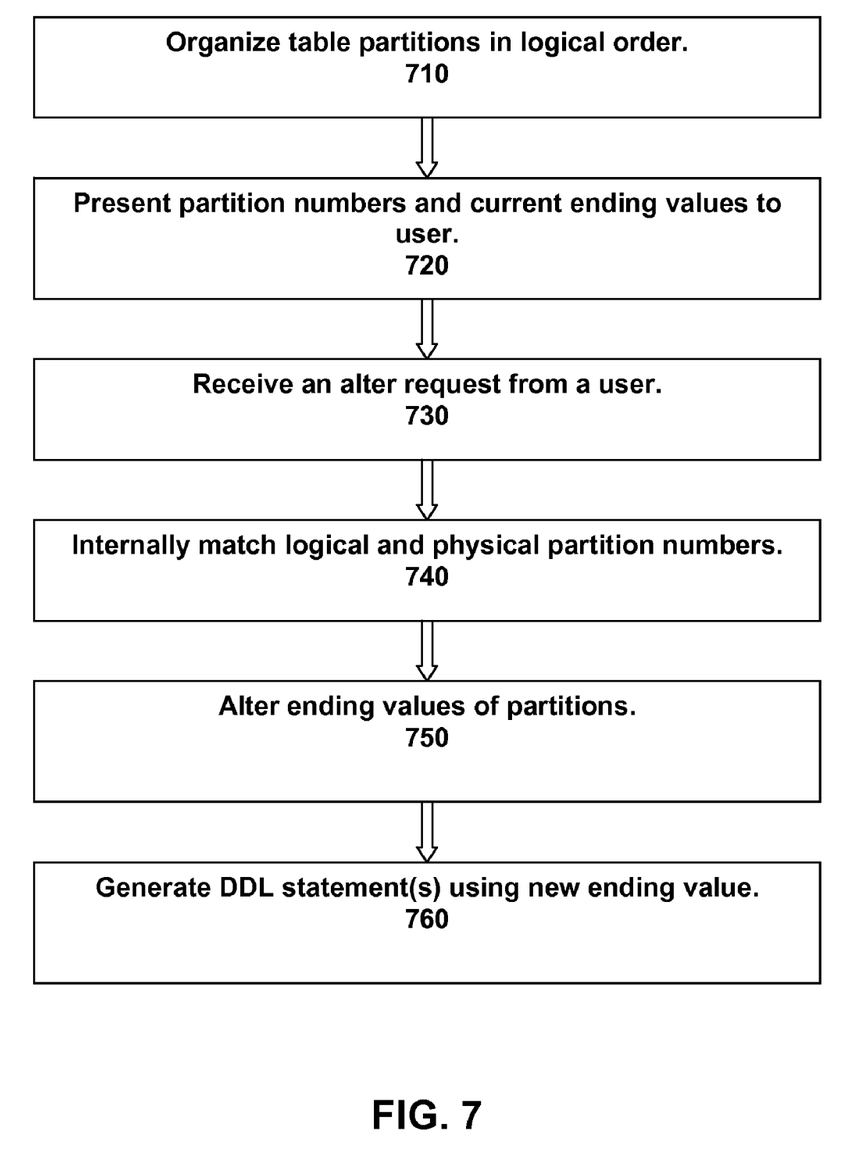
FIG. 7 is a flow chart of a method according to an embodiment of the present invention.

In step 730, we receive an ALTER request from the user. Preferably, but not necessarily, this ALTER request is delivered via the same graphical user interface that was employed to display the partition numbers. In step 740, we begin the process of manipulating the table by first internally matching the logical partition number to its corresponding physical partition number. Next in step 750 we alter the current ending values of the partitions specified by the user. Note that at this point the table has not been physically changed. The table will be physically changed after step 760 where we generate the required data definition language statements and they are executed by the user.

Figure 8:
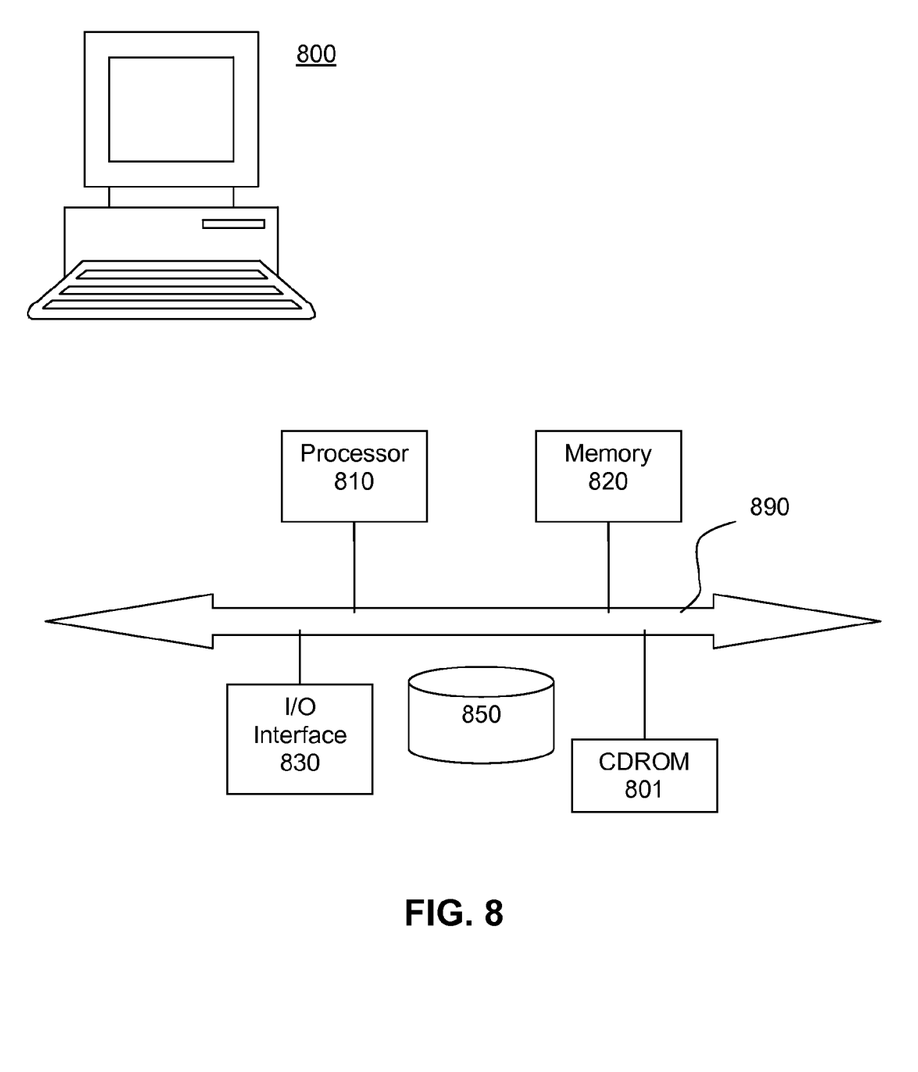
FIG. 8 shows a simplified block diagram of a system configured to operate according to an embodiment of the present invention.

Referring to FIG. 8 there is shown a highly-simplified illustration of an information processing system 800 configured to operate according to an embodiment of the present invention. For purposes of this invention, computer system 800 may represent any type of computer, information processing system or other programmable electronic device, including a client computer, a server computer, a portable computer, an embedded controller, a personal digital assistant, and so on. The computer system 800 may be a stand-alone device or networked into a larger system.

The system 800 includes a number of components, such as a processor 810 operatively connected with a memory 820, and an input/output (I/O) subsystem 830. The input/output subsystem 830 includes a display for presenting the table to a user. The I/O subsystem 830 preferably uses a graphical user interface for the interaction with the user. The system 800 will also contain any number of operators and peripheral devices common to computing systems.

The processor 810 may be a general or special purpose microprocessor operating under control of computer program instructions executed from memory 820. The processor 810 may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) tangibly stored in memory 820 that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips. The memory 820 may be partitioned or otherwise mapped to reflect the boundaries of the various memory subcomponents.

The memory 820 represents either a random-access memory or mass storage. It can be volatile or non-volatile. The system 800 can also comprise a magnetic media mass storage device such as a hard disk drive 850.

The I/O subsystem 830 may comprise various end user interfaces such as a display, a keyboard, and a mouse. The I/O subsystem 830 may further comprise a connection to a network such as a local-area network (LAN) or wide-area network (WAN) such as the Internet. Processor 810 and memory 820 components are physically interconnected using conventional bus architecture 890.

According to an embodiment of the invention, a computer readable medium, such as a CDROM 801 can include program instructions for operating the programmable computer 800 according to the invention. What has been shown and discussed is a highly-simplified depiction of a programmable computer apparatus. Those skilled in the art will appreciate that a variety of alternatives are possible for the individual elements, and their arrangement, described above, while still falling within the scope of the invention. Thus, while it is important to note that the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of media actually used to carry out the distribution. Examples of media include ROMs, DVD-ROMs, and transmission-type media, such as digital and analog communication links, wired or wireless communications links using transmission forms, such as, for example, radio frequency and light wave transmissions. The media make take the form of coded formats that are decoded for use in a particular data processing system. The general architecture and concept of this invention is not specific to any computer language or hardware architectural platform.

Advantages of Invention. With this invention, however, the same tasks are completely automated with automatically generated DDL that is guaranteed to work each and every time—no matter how complex, no matter how many partitions, and no matter how jumbled the relationships between logical and physical partition numbers—taking only seconds by making a few keystrokes on easy to comprehend screens that present the partitioning and ending values of a TCP table's partitions in logical order and removing any necessity for users to concern themselves with the underlying physical relationships or the exact sequence physical partitions must be altered in order to achieve a successful error-free execution of the generated DDL statements and a trouble free commitment of the wanted changes using only ALTER statements.

We claim:

1. A method for propagating alterations to partitions of database table objects, the method comprising:
   in a table comprising logical and physical table partitions, using a processor device to safely organize table partitions in logical order, wherein logical order is different from physical order which would adversely impact presentation and ordering of partition ending values;
   presenting table partition numbers and their current ending values in logical order to a user;
   receiving an alter request from the user, the alter request specifying at least one logical partition number and its corresponding ending value to alter;
   internally matching the specified logical partition number to its corresponding physical partition number;
   altering a logical ordering of the table partitions based on the alter request;
   wherein altering the logical ordering of the table partitions provokes no physical change in the table; and
   automatically generating at least one data definition language (DDL) statement corresponding to the alter request, using new ending values for the physical partitions, thereby altering the physical partitioning of the table by altering at least the current ending value of the physical partition to which the specified logical partition number is associated when the DDL statement is executed;
   wherein the method organizes and presents the partitions and their ending values using only their logical numbers and sequencing, while removing from the user concerns as to their underlying physical numbering relationships, and wherein a user of the method manages partitions of a table object's tablespace through logical means.

2. The method of claim 1 further comprising:
   generating utility statements for redistributing data of the physical partition corresponding to the specified logical partition number according to the altered ending value.

3. The method of claim 1 further comprising:
   restoring an alteration by applying a corresponding reverse alteration.

4. The method of claim 1 wherein the altering element further comprises:
   logically pushing a specified logical partition through an existing logical partition by altering the existing logical partition's ending value, until a last logical partition is reached using its corresponding physical partition number;
   adding a new partition with a same ending value as the last logical partition prior to the alter command so as to cause data rows that occupy the partitions, from the point of logical insertion, to be redistributed to subsequent ascending partitions based on each partition's new ending value.

5. The method of claim 1 wherein the table partition numbers and their ending values are presented in ascending order.

6. The method of claim 1 wherein the table partition numbers and their ending values are presented in descending order.

7. The method of claim 1 wherein the table partition numbers are presented sequentially in their physical order.

8. The method of claim 1 wherein the table partition numbers are presented sequentially in their logical order.

9. A computer program product embodied on a non-transitory computer readable storage medium and comprising code that, when executed, causes a computer to perform the following operations on a database table object comprising logical and physical table partitions:
   in a table comprising logical and physical table partitions, organize the table partitions in logical order;
   present table partition numbers and their ending values in logical order to a user, wherein logical order is different from physical order which would adversely impact the presentation and ordering of partition ending values;
   receive an alter request from the user, the alter request specifying at least one logical partition number and its corresponding ending value to alter;
   internally match the specified logical partition number to its corresponding physical partition number;
   alter the logical partitioning of the table by manipulating one or more ending key values of partitions by altering the ending value of the specified logical partition number;
   wherein altering the logical partitioning of the table provokes no physical change in the table; and
   automatically generate at least one DDL (data definition language) statement corresponding to the alter request, using the altered ending value for the physical partitions, thereby altering the physical partitioning of the table by altering at least the current ending value of the physical partition to which the specified logical partition number is associated when the DDL statement is executed;
   wherein the system organizes and presents the partitions and their ending values using only their logical numbers and sequencing, while conveniently removing from the user concerns as to their underlying physical numbering relationships, and wherein a user of the system manages partitions of a table object's tablespace through logical means.

10. The computer program product of claim 9 wherein the alter request comprises one or more DB2 ALTER TABLE commands.

11. The computer program product of claim 9 wherein the database table object uses table controlled partitioning.

12. The computer program product of claim 9 wherein the database table object uses index controlled partitioning.

13. An information handling system for propagating alterations to partitions of database table objects, the information handling system comprising:
   a database comprising a table comprising logical and physical table partitions;
   a display configured for presenting a visual representation of at least a portion of the table to a user of the database;
   an input/output interface configured for prompting the user to enter data and for receiving data entered by the user;
   a processor configured for executing code that enables a computer to:
   organize table partitions in logical order, wherein logical order is different from physical order which would adversely impact the presentation and ordering of partition ending values;
   cause the display to present table partition numbers and their current ending values in logical order to the user;

receive an alter request from the user via the input/output interface, the alter request specifying at least one logical partition number and its corresponding ending value to alter;

internally match the specified logical partition number to its corresponding physical partition number;

alter a logical ordering of the table partitions based on the alter request;

wherein altering the logical ordering of the table partitions provokes no physical change in the table; and automatically generate at least one data definition language (DDL) statement corresponding to the alter request, using new ending values for the physical partitions, thereby altering the physical partitioning of the table by altering at least the current ending value of the physical partition to which the specified logical partition number is associated when the DDL statement is executed;

wherein the system organizes and presents the partitions and their ending values using only their logical numbers and sequencing, while conveniently removing from the user concerns as to their underlying physical numbering relationships, and wherein a user of the system manages partitions of a table object's tablespace through logical means.

14. The information handling system of claim 13 wherein the processor further causes the display to present the table partition numbers in their logical order.

15. The information handling system of claim 13 wherein the processor is further configured for physically altering the table by executing the automatically generated at least one data definition language statement.

16. The information handling system of claim 13 wherein the table uses table-controlled partitioning.

17. The information handling system of claim 13 wherein the table uses index-controlled partitioning.

18. The information handling system of claim 13 wherein the database uses DB2 software.

* * * * *